United States Patent
Parsa et al.

(10) Patent No.: US 6,757,319 B1
(45) Date of Patent: Jun. 29, 2004

(54) CLOSED LOOP POWER CONTROL FOR COMMON DOWNLINK TRANSPORT CHANNELS

(75) Inventors: Kourosh Parsa, Riverside, CT (US); Emmanuel Kanterakis, North Brunswick, NJ (US)

(73) Assignee: Golden Bridge Technology Inc., West Long Branch, NJ (US)

( * ) Notice: Subject to any disclaimer, the term of this patent is extended or adjusted under 35 U.S.C. 154(b) by 692 days.

(21) Appl. No.: 09/722,685

(22) Filed: Nov. 28, 2000

Related U.S. Application Data

(60) Provisional application No. 60/167,852, filed on Nov. 29, 1999.

(51) Int. Cl.[7] .............................. H04B 1/69; H04B 7/216
(52) U.S. Cl. ....................................... 375/141; 370/441
(58) Field of Search ................................ 375/130, 131, 375/140, 141, 146, 147; 370/335, 342, 394, 441, 445

(56) References Cited

U.S. PATENT DOCUMENTS

| | | |
|---|---|---|
| 5,103,459 A | 4/1992 | Gilhousen et al. |
| 5,280,472 A | 1/1994 | Gilhousen et al. |

(List continued on next page.)

FOREIGN PATENT DOCUMENTS

| | | |
|---|---|---|
| WO | 003499 A1 | 1/2000 |
| WO | 008908 A2 | 2/2000 |
| WO | 018172 A1 | 3/2000 |
| WO | 022873 A1 | 4/2000 |
| WO | 057591 A1 | 9/2000 |
| WO | 057663 A1 | 9/2000 |

OTHER PUBLICATIONS

Dr. Kourosh Parsa, "Common Packet Channel (CPCH): The optimum Internet Mechanism in W–CDMA," 2000, IEE, pp 148–155.*

Dr. Kourosh Parsa, "An Overview of Common Channel (CPCH), an Optimum Wireless Internet mechanism in 3GPP W–CDMA System and Comparison of Various UMTS Non Real Time Data Deployment Options," 2000, IEEE, pp 388–395.*

Hyu–Dae Kim et al., "A Prioritized Random Access With Discrimination Power Ramping Step Size," Hyu–Dae Kim et al, 2000, IEEE, pp 1751–1757.*

Lei Zhou et al., "Performance Analysis of CPCH–Type Packet Channels for Variable–Bit–Rate Applications," , 2001, IEEE, pp 1130–1133.*

(List continued on next page.)

*Primary Examiner*—Tesfaldet Bocure

(57) ABSTRACT

To increase capacity in a spread spectrum packet communication system, a closed loop power control (CLPC) is provided for a common/shared downlink transport channel, such as a Forward Access Channel (FACH) and Downlink Shared Channel (DSCH), by using an existing uplink Common Packet Channel (CPCH) mechanism. After an appropriate access phase and a collision detection phase, a mobile station sends its closed-loop power control information along with any packet data over the CPCH uplink channel. Concurrently, the base station (BS) begins its downlink transmission of data and control information to the mobile station (MS). The base station transmits the packet data through the common/shared downlink transport channel, and the power of that transmission is controlled in response to the control information sent by the MS. The power of the uplink transmission from the MS is controlled in response to the control information sent by the BS, for example via a dedicated downlink channel (DCH).

31 Claims, 6 Drawing Sheets

U.S. PATENT DOCUMENTS

| | | |
|---|---|---|
| 5,295,140 A | 3/1994 | Crisler et al. |
| 5,329,550 A | 7/1994 | Rousseau et al. |
| 5,384,777 A | 1/1995 | Ahmadi et al. |
| 5,461,639 A | 10/1995 | Wheatley, III et al. |
| 5,537,397 A | 7/1996 | Abramson |
| 5,544,196 A | 8/1996 | Tiedemann, Jr. et al. |
| 5,671,218 A | 9/1997 | I et al. |
| 5,673,259 A | 9/1997 | Quick, Jr. |
| 5,729,542 A | 3/1998 | Dupont |
| 5,802,465 A | 9/1998 | Hamalainen et al. |
| 5,825,835 A | 10/1998 | Kingston et al. |
| 5,850,602 A | 12/1998 | Tisdale et al. |
| 5,875,182 A | 2/1999 | Hatzipapafotiou |
| 5,893,036 A | 4/1999 | Trandai et al. |
| 5,894,472 A | 4/1999 | de Seze |
| 5,933,777 A | 8/1999 | Rahman |
| 5,943,327 A | 8/1999 | Mademann |
| 5,953,369 A | 9/1999 | Suzuki |
| 5,982,763 A | 11/1999 | Sato |
| 5,991,308 A | 11/1999 | Fuhrmann et al. |
| 6,009,089 A | 12/1999 | Huang et al. |
| 6,011,788 A | 1/2000 | Hurst et al. |
| 6,026,081 A | 2/2000 | Hamabe |
| 6,031,832 A | 2/2000 | Turina |
| 6,038,223 A | 3/2000 | Hansson et al. |
| 6,038,250 A | 3/2000 | Shou et al. |
| 6,091,757 A | 7/2000 | Cudak et al. |
| 6,115,390 A | 9/2000 | Chuah |
| 6,141,373 A | 10/2000 | Scott |
| 6,144,841 A | 11/2000 | Feeney |
| 6,144,861 A | 11/2000 | Sundelin |
| 6,163,533 A | 12/2000 | Esmailzadeh et al. |
| 6,163,708 A | 12/2000 | Groe |
| 6,169,759 B1 | 1/2001 | Kanterakis et al. |

OTHER PUBLICATIONS

Dr. Kourosh Parsa et al. "System Engineering of Data Services in UMTS W–CDMA Systems," 2001, IEEE, pp 1373–1380.*

Young Dae Lee et al. "Performance Evaluation of Start of Message Indicator Mechanism for Uplink Common Channel in UTMS W–CDMA," 2001, IEEE, pp 2292–2296.*

"Start UMTS Services with 3G–GPRS:CPCH/FACH," *Golden Bridge Technology*, Innovations and Technologies, pp. 1–20 (Jun. 27, 2000).

The Common Packet Channel considered the $3^{rd}$ Generation GPRS, *System Engineering of Data Services in UMTS W–CDMA Systems, IST Mobile Communications Summit*, Galway, Ireland, Oct. 1–4, 2000.

* cited by examiner

CLOSED LOOP POWER CONTROL FOR COMMON DOWNLINK TRANSPORT CHANNELS

RELATED APPLICATION

This application claims the benefit of U.S. Provisional Application No. 60/167,852, entitled "Closed Loop Power Control of the Forward Access Channel (FACH), Downlink Common Packet Channel via Uplink CPCH" filed on Nov. 29, 1999, the disclosure of which is entirely incorporated herein by reference.

FIELD OF THE INVENTION

This invention relates to spread-spectrum communications, and more particularly to code-division-multiple-access (CDMA) cellular, packet-switched communication systems. The inventive concepts involve using a Common Packet Channel (CPCH) as an uplink transport channel to perform closed-loop power control of a common or shared downlink transport channel, such as the Forward Access Channel (FACH) or the Downlink Shared Channel (DSCH).

BACKGROUND

Recent developments in wireless communications technologies have allowed expansion of service offerings from the original voice telephone service model to include a number of services supporting packet data communications. As customers become increasingly familiar with data services offered through landline networks, they are increasingly demanding comparable data communications in the wireless domain, for example to maintain service while mobile subscribers roam freely or to provide remote service in locations where wireless loops are preferable to landline subscriber loops. A number of technologies support packet data communications in the wireless domain. Increasingly, these technologies rely on direct sequence spread spectrum communication over the air-link.

In a conventional Code Division Multiple Access (CDMA) communication system, information transmitted between stations is modulated using a spreading code. All stations transmit over one common frequency band. Different spreading codes are used to distinguish information associated with different stations. Logically speaking, the "channels" in such a communication system correspond to the different codes.

Since all stations transmit information using the common frequency band, the transmission from each station interferes with the communications of the other stations. In any such direct sequence spread spectrum communication system, when a particular device is attempting to receive a transmission, any transmissions of other stations using codes not recognized by or assigned to the particular device appear as background noise. If the noise level is too high at the receiver, that device can not accurately distinguish transmissions directed to it even though the signals were spread using the assigned code(s). For example, signals received by a base station from a mobile station close to the base station are much stronger than signals received from other mobile stations located at the base station's cell boundary. As a result, distant mobile communications are overshadowed and dominated by closein mobile stations. This condition is sometimes referred as the "near-far effect."

To increase capacity it becomes necessary decrease interference. To that end, most conventional CDMA communication techniques involve some form of transmission power control. In a CDMA system, all mobile-transmitted signals should arrive at the base station with about the same average power irrespective of their distance from the base station. Typically, the mobile station attempts to control its transmit (uplink) power within a relatively small tolerance based on power control messages from the base station. Conventional dedicated channel communications in CDMA utilize a similar closed-loop power control for the downlink (or forward) transmit channel, except during hand-off wherein each base station varies the transmit power using an open-loop control algorithm.

These direct sequence spread spectrum communication techniques have been extensively developed and deployed to offer circuit switched communication services, particularly for voice telephone grade communications of mobile customers. These systems offer some limited data communications capabilities. However, customers increasingly are demanding higher-rate packet data communications in the wireless domain. Considerable technological effort is under way in the wireless industry to develop a third generation (3G) digital communication system, which among other services, will support higher-rate packet data communications.

Currently, there are two modes of operation for packet data transport in the 3GPP UMTS standard for wideband code division multiple access (W-CDMA), circuit mode and packet mode. A Dedicated Channel (DCH) is used to transfer packet data in a circuit mode of operation in both directions. In the packet mode, the Common Packet Channel (CPCH), the Forward Access Channel (FACH), and the Downlink Shared Channel (DSCH) offer a common packet data mechanism for bursty data Internet traffic, such as:

E-Commerce
Unified Messaging
Video Clips
Video Monitoring
Web Browsing
Chatting
Picture and File Transfers As presently envisage for packet services, there are two or more "common/shared downlink transport channels," of which the Forward Access Channel FACH is one and the Downlink Shared Channel (DSCH) is the other. In the current standards, the operation of the downlink common transport channels does not support closed loop power control (CLPC). In the case of DSCH, a pair of dedicated channels, one of which for the uplink and the other of which for the downlink, can be used to enable CLPC. However, this method is very inefficient and wastes valuable system capacity.

FIG. 1 shows an example of the current operation of a FACH type common downlink channel. As shown, the base station listens to a signaling message periodically sent by the mobile station indicating the level at which the mobile station can listen (lower line). Then, the base station transmits the packet through the FACH (top line). The base station can signal to the MS to initiate a downlink packet transfer through one of the available mechanisms, such as the FACH, the Broadcast Channel (BCH) or the Paging Indicator.

A basic common-packet channel (CPCH) provides an uplink transport channel for transmitting variable size packets from a mobile station (MS) to a base station (BS) without the need for direct resource allocation. The channel resource allocation is contention based. A number of mobile stations could at any time contend for the same resources, as found in ALOHA systems.

FIG. 2 shows the operation of a mobile station over a CPCH channel together with the related indicator channel and downlink channel from the base station. In operation, a mobile station (MS), having all the necessary information from a nearby BS, starts transmitting a series of access preambles as shown at AP in the lower line in FIG. 2. Each particular access preamble in the series is the same preamble, selected from a set of predefined access preambles corresponding to CPCH channels operating through the base station. The MS transmits each particular access preamble (AP) at predefined time intervals and at increasing power levels, preferably in a step-wise manner. The transmitted power during each access preamble transmission is constant.

When the base station receives and identifies one of the access preambles, it responds by transmitting a corresponding acknowledgment AP-ACK over the AP indicator channel (AP-AICH), as shown in the middle line in FIG. 2. With this ALOHA type access technique, there is a good possibility that two or more MSs may try to access the BS using the same access preamble at substantially the same time. In such a case, the AP-ACK acknowledgement signal could be successfully received by more than one MSs. If these MSs are allowed to transmit data, the transmissions will collide. In case of collision, none of the data from either of the transmitting MSs will be received correctly. To resolve this problem, the MSs need to undergo a collision detection or "CD" phase.

In the CD phase, upon receiving an AP-ACK acknowledgement, the MS randomly selects a collision detection (CD) signature from a predetermined set of possible CD signatures. The MS transmits a CD preamble containing the coded CD signature (shown as a CD packet in the lower line of FIG. 2). If the base station successfully receives a CD preamble, it sends back a CD acknowledgement (CD-ACK), which is the same as or otherwise corresponds to the CD signature transmitted by the MS, over a downlink indicator channel known as CD-ICH, as appears in the middle line in the drawing. The BS responds to only one of the many possible received CD preamble signatures transmitted by different MSs, to thereby allocate the CPCH channel to one of the contending mobile stations.

Upon receiving a CD-AICH corresponding to its own CD preamble signature, indicating that there are no collisions or the base station has resolved any collision, the MS will begin to send its closed-loop power control information along with its packet data. The BS will also begin to send any message data together with any closed-loop power control information over the downlink channel (top line in FIG. 2).

Data sent over the FACH (FIG. 1) can be transmitted only using a slow power control. Slow power control is equivalent to a downlink open loop power control. The power level at which the packet is transmitted constantly over the FACH is determined based on a signaling message periodically sent by the intended receiving mobile station (MS). As shown in FIG. 1, the base station transmits the message through the FACH at a constant level for the duration of the packet transmission, that is to say, at the continuous level indicated in the signaling message periodically sent by the mobile station. This type of power control is not very accurate and does not allow for any form of dynamic adjustment.

If a common downlink channel is used, such as FACH, there is no closed loop power control for the associated uplink channel because the common channel has no power control capability. Likewise, if a common uplink channel, such as a random access channel, (RACH) is used, then there will be no closed loop power control for the downlink channel. CLPC is possible only when the UL has control feature (e.g. using CPCH) and when the DL has control feature (e.g. DCH counterpart to FACH/DSCH).

As shown by the above discussion, these newer spread-spectrum techniques intended for wideband packet communication utilize CDMA spreading techniques, but so far have provided closed loop power control only for the dedicated channels and certain uplink common transport channels with predefined closed loop power control capabilities.

When a common or shared downlink packet channel does not support closed loop power control, the noise level and attendant interference over the air-link increases, which decreases the downlink capacity of the system. The downlink capacity becomes a significant quality of service issue for asymmetric communication services via the network, such as web browsing.

SUMMARY OF THE INVENTION

This invention introduces or enhances closed loop power control (CLPC) for common downlink transport channels, which addresses the above issue, thus improving the downlink capacity of these channels. The method provides an approach to resolve the lack or inefficiency of CLPC capability by using an existing uplink Common Packet Channel mechanism.

Hence, a general objective of the invention is to use a Common Packet Channel communication mechanism to enable closed loop power control for common or shared downlink transport channels, such as the forward access channel (FACH) and the downlink shared channel (DSCH).

Another objective relates to creating a bi-directional interactive or concurrent service by combining CPCH with the common/shared downlink transport channel.

The present invention provides an improvement to a code-division-multiple-access (CDMA) system employing spread-spectrum modulation. The present invention involves a closed loop power control (CLPC) for a common downlink transport channel, such as a Forward Access Channel (FACH), by using an existing uplink Common Packet Channel (CPCH) mechanism. Aspects of the invention encompass methods utilizing the CPCH mechanism for closed-loop power control of the common downlink transport channel, as well as base stations and mobiles stations and base-band processors for use in such stations, which implement the inventive closed-loop power control technique.

In a preferred embodiment, the CDMA system has a radio network controller (RNC) and a plurality of base stations, which serve a plurality of mobile or remote stations. Each base station (BS) has a BS-spread-spectrum transmitter and a BS-spread-spectrum receiver. Each mobile station (MS) has an MS-spread-spectrum transmitter and an MS-spread-spectrum receiver. In the preferred embodiment, the RNC monitors traffic demand, based on traffic measurement information of communications through the base stations for the mobile stations. Based on the traffic demand or a projection thereof, the RNC assigns channel resources to the base stations, by re-configuring the channel resources within each cell.

When a packet needs to be sent to a mobile station (MS), the RNC schedules the transmission at time t1 and controls the base station (BS) to broadcast, via a common broadcast channel, such scheduled transmission. At the recipient MS, upon receiving the broadcast, the steps preferably implement an access phase, a collision detection phase and a data transmission phase. There may also be a power control phase between the collision detection phase and the data transmission phase. As discussed more below, the data transmission phase provides closed loop power control.

The access phase includes starting transmission of a series of access preambles (AP) at well-selected time intervals and at increasing power levels. The MS stops its transmission of the AP when it successfully receives an acknowledgment AP-ACK, which indicates that the base station (BS) has picked up and detected one of the AP transmissions. Alternatively, the MS ceases its access preamble transmissions if the MS has transmitted the maximum allowed number of access preambles $M_{AP}$.

Upon receiving this AP-ACK signal, each MS seeking access to the CPCH channel initiates the collision detection phase. Specifically, each such MS randomly selects one collision detection (CD) signature from a predefined signature set and transmits a CD preamble containing that signature. Since each mobile station randomly selects one of the possible collision detection (CD) signatures, typically, no two mobile stations seeking access to the same channel will pick the same CD signature. When the base station receives only one CD preamble, it assumes the CD preamble is sent by the intended recipient MS and proceeds to send a CD acknowledgment CD-ACK over the CD-ICH. The CD-ACK corresponds to the CD preamble signature from the MS. When the base station receives more than one CD preamble, it assumes at least one of the unintended recipients has mistaken itself as the intended recipient of the scheduled packet. Since the BS cannot identify the intended recipient based on the randomly selected CD signatures, it will refrain from responding to any of the CD preambles. The BS may repeat the process again from the beginning, until it has reached the maximum number of allowable tries.

Upon receiving a CD acknowledgement CD-ICH, which corresponds to the sent CD signature, the MS waits and begins to send its closed-loop power control along with any packet data at $t_1$, $t_1$ being the start of the data transmission phase. Concurrent with the transmission by the MS at t1, the base station (BS) begins its transmission to the MS. The base station transmission includes transmission of the packet data through a common downlink transport channel as well as transmission of the control information through a dedicated channel. The power of the BS transmission is controlled in response to the control information sent by the MS, and the power of the MS transmission is controlled in response to the control information sent by the BS. The closed-loop control of both air-link channels continues throughout the packet communication, to substantially continuously vary the power level of both the uplink and the downlink common transport channels.

Since the MS can send data along with its power control information, a bi-directional interactive transmission is created that incorporates two-way closed-loop power control. The MS ceases transmission immediately upon the release of the common downlink shared channel.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
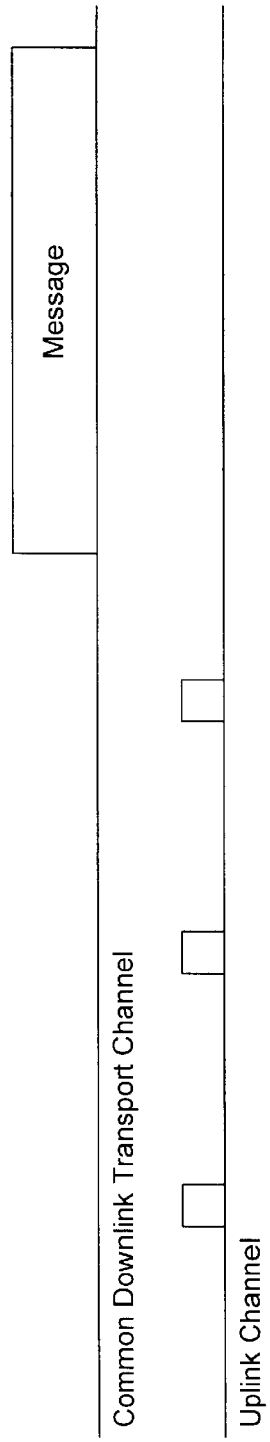
FIG. 1 is a timing diagram showing the operation of an existing common downlink transport channel, such as a prior art Forward Access Channel (FACH).
Figure 2:
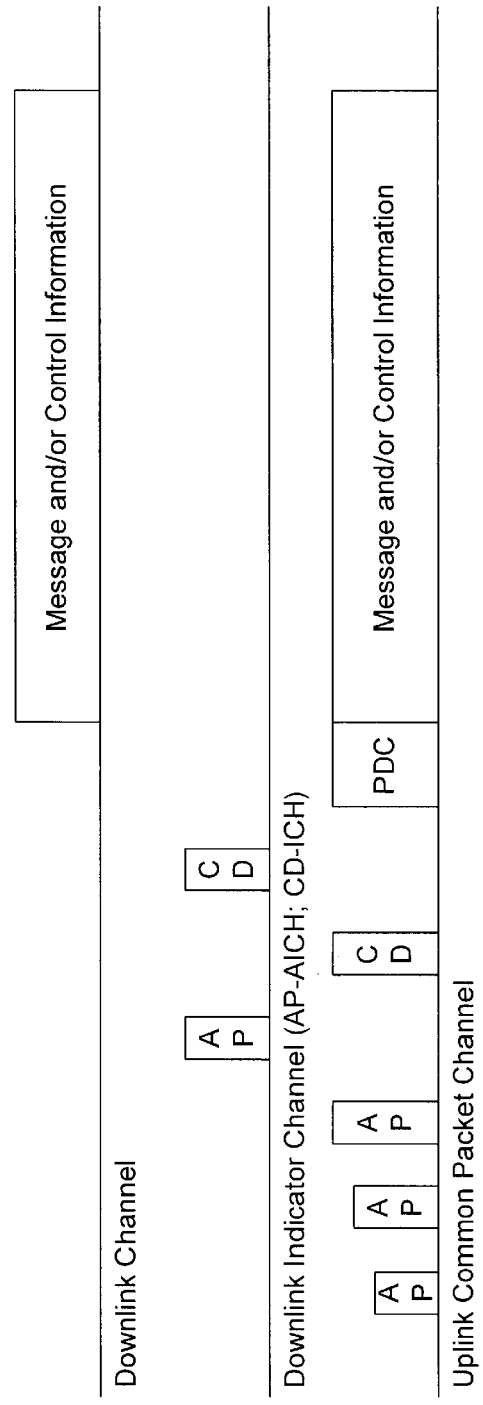
FIG. 2 is a timing diagram showing the operation of an existing uplink common packet channel (CPC) and an associated downlink channel.

Reference now is made in detail to the presently preferred embodiments of the invention, examples of which are illustrated in the accompanying drawings, wherein like reference numerals indicate like elements throughout the several views.

The present invention involves a closed loop power control (CLPC) for common/shared downlink transport channels, such as a Forward Access Channel (FACH) or the Downlink Shared Channel (DSCH), by using an existing uplink Common Packet Channel (CPCH) mechanism. When a packet needs to be sent to a mobile station (MS), the base station (BS) broadcasts the intent to transmit for the particular mobile station, via a common broadcast channel. In response, the recipient MS initiates its procedures for exchanging signals to obtain access to a common packet channel (CPCH) type uplink transport channel. These procedures preferably include an access phase and a collision detection phase.

During the initial communications, the mobile station measures the power level of the various signals from the base station. Upon successfully obtaining access to the CPCH uplink transport channel, the MS begins to send its closed-loop power control information along with any packet data. The closed loop power control information includes an instruction to the base station to increase, decrease or keep constant the power level of the downlink transmission, particularly for use in controlling transmissions over the common downlink transport channel. The actual instruction is one derived from the measurement of signals from the base station. Concurrently, the base station (BS) begins its downlink transmission of data and control information to the MS. The base station transmits the packet data through a common downlink transport channel, and the power of that transmission is controlled in response to the control information sent by the MS. The power of the uplink transmission from the MS is controlled in response to the control information sent by the BS over a dedicated channel solely used for the control purpose. The closed loop power control of both the uplink and the downlink continue until completion of the packet communication between the base station and the mobile station. Hence, a bi-directional interactive transmission is created that incorporates substantially continuous two-way closed-loop power control.

In a preferred embodiment (FIG. 3), the CDMA wireless communication system comprises a radio network controller (RNC) 11, a plurality of base stations 13 and a plurality of mobile stations 15. Although referred to as "mobile" stations 15, those skilled in the art will recognize that a station 15 may be any user station that is remote from the base stations 13, for example at the user end of a wireless loop.

Each base station (BS) 13 has BS-spread-spectrum transmitter and a BS-spread-spectrum receiver, shown as a single transceiver (XSCV'R) system 17 for simplicity in this drawing. Each of the mobile stations (MS) 15 has an MS-spread-spectrum transmitter and an MS-spread-spectrum receiver (not separately shown). Exemplary transmitters and receivers for use in the BS and MS network elements are discussed in more detail below with regard to FIGS. 5, 6 and 7.

In a typical embodiment, the radio network controller (RNC) 11 provides two-way packet data communications to a wide area network, shown by way of example as a packet-switched network 19. The RNC 11 and the network 19 provide the MS units 15 with two-way packet data communications services to enable communication to and from devices, represented by way of example by the IP telephone 21, the personal computer (PC) 23 and the server 25.

Figure 4:
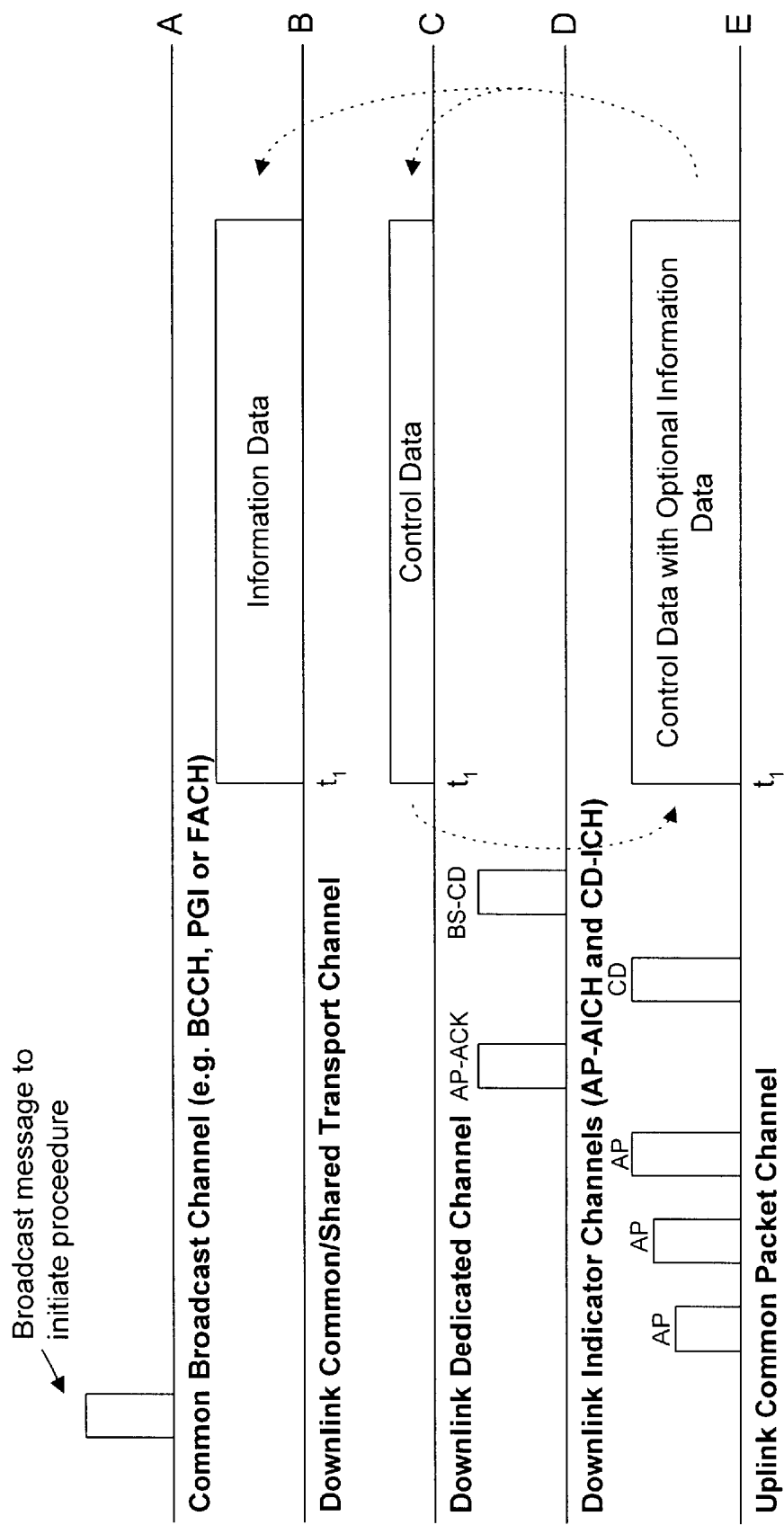
FIG. 4 is a timing diagram showing the operation of common downlink transport channel and an associated CPCH uplink channel, with closed loop power control in accord with the present invention.

The CDMA system provides a number of logically different channels for upstream and downstream communications over the air-link interface (see e.g. FIG. 4). Each channel is defined by one or more of the codes, for example the scrambling code and/or the spreading code used to modulate the relevant signals. Several of the channels are common channels for certain administrative and signaling functions, but most of the channels are used for uplink or downlink packet communications between the base stations 13 and the mobile stations 15. The uplink or downlink packet communications between the base stations 13 and the mobile stations 15 utilize some dedicated channels, which are assigned to an individual mobile station for the duration of a communication session. However, many of the uplink and downlink channels are common or shared channels available to all mobiles operating through a cell or sector of a particular base station, on essentially an as-needed basis.

Each common-packet channel CPCH through the system is an uplink transport channel for transmitting variable size packets from a mobile station (MS) 15 to a base station (BS) 13. The common downlink channels include a forward access channel (FACH) and/or for a downlink shared channel (DSCH).

Upon power-up, an MS 15 searches for a transmission from any nearby BS 13. Upon successful synchronization with one or more BSs, the MS 15 receives the necessary system parameters from a continuously transmitted BS broadcast control channel (BCCH), which is broadcast by all base stations 13. Using the information transmitted from the BCCH, the MS 15 can determine various parameters required when first transmitting to a BS. Parameters of interest are the loading of all the base stations in the vicinity of the MS, their antenna characteristics, spreading codes used to spread the downlink transmitted information, timing information and other control information.

Figure 3:
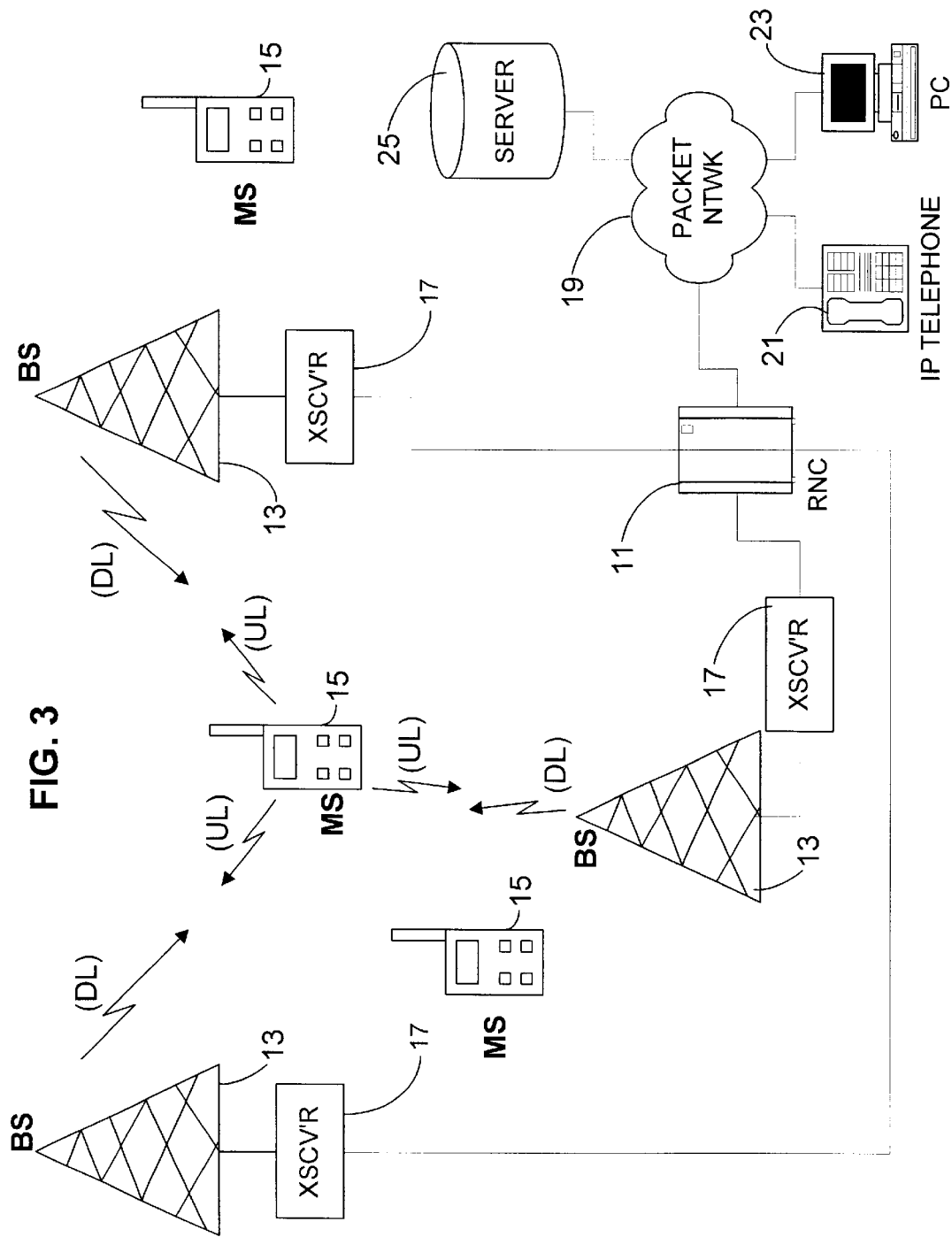
FIG. 3 is a functional block diagram of a CDMA network, capable of implementing the communications in accord with the present invention.

With this information, the MS 15 can transmit specific waveforms in order to capture the attention of a nearby BS 13 and obtain access to particular channel resources. The network of FIG. 3 provides both circuit mode and packet mode services. The circuit mode typically relies on assignment of Dedicated Channel (DCH) resources for communications in both directions. The packet mode, which is of particular interest in the present discussion, utilizes common or shared channel resources. In the preferred embodiment, the uplink packet communications utilize a Common Packet Channel (CPCH), and the downlink packet communications utilize the Forward Access Channel (FACH).

FIG. 4 schematically illustrates the timing of the operations of the network of FIG. 3 in accord with the invention. The drawing shows the signals communicated via: a common broadcast channel (line A), a downlink channel that is a common or shared resource (line B), a dedicated downlink channel (line C), downlink indicator channels (line D) and an common packet channel (CPCH) for uplink communications (line E). Those skilled in the art will recognize that the spread spectrum communication system defines these various channels by the use of different codes, for example a spreading code and/or a scrambling code for each channel.

As shown, when the system has a first packet to transmit to the mobile station, the RNC schedules the transmission at $t_1$ and causes the service base station 13 to broadcast the information to the particular MS over a common broadcast channel, e.g. the BCCH or the FACH (line A in FIG. 4). Upon receiving the broadcast information, the MS 15 then enters the access phase, in which the mobile station (MS) 15 initiates a ramp-up process in order to capture the attention of the nearby BS and seize one of the CPCH uplink transport channels (see line E).

The access phase involves the MS-spread-spectrum transmitter sending one of more access preambles (AP), in access slots defined in relation to a frame-timing signal derived from receipt of the common synchronization channel (not shown). The MS transmits a set of access preambles of duration Tp whose power is increased in time from preamble transmission to preamble transmission, preferably in a stepwise manner.

Each access preamble contains an AP signature selected from a set of predefined signatures. The AP signatures correspond to the CPCH channels serviced through the particular base station. When the base station 13 receives and identifies one of the access preambles, assuming the CPCH channel is available, the base station responds by transmitting a corresponding acknowledgment AP-ACK over the AP indicator channel (AP-AICH), as shown in line D in FIG. 4. The mobile station 15 discontinues its transmission of the access preambles upon receipt of an acknowledgment AP-ACK. Alternatively, the MS 15 will cease its transmission of access preambles if the MS has transmitted the maximum allowed number of access preambles $M_{AP}$.

With this type of access technique, there is a good possibility that two or more MSs 15 may try to access the BS 13 using the same access preamble at substantially the same time. The AP-ACK acknowledgement signal is sent back and may be successfully received by a number of MSs 15, which are contending for access via the BS 13, using the same access preamble signature. In this event, more than one MS will have succeeded through the ramp-up in the access phase at the same time.

Each successful MS 15 and the BS 13 will then enter a Collision Detection (CD) phase, where the BS may only assign a CPCH channel to only one of the contending mobile stations 15. In this collision resolution phase, upon receiving this AP-ACK, each successful MS randomly selects a collision detection (CD) signature and transmits a CD preamble containing that CD signature (on the UL channel shown in line E of FIG. 4). If only one CD preamble is received, the BS will respond by transmitting back a base station CD preamble, specifically a CD ACK signal, which corresponds to the CD signature contained in that one CD preamble from the mobile station. In the case where the BS receives more than one CD preamble, the BS assumes that two mobile stations perceived that the scheduled packet is intended for them. Since the BS cannot determine or identify the intended recipient MS, it will refrain from transmitting any CD ACK. Any mobile station 15 that transmitted a CD preamble but failed to receive a corresponding acknowledgement over the CD-AICH will refrain from further transmissions on the CPCH channel in the subsequent data transmission phase. If the BS refrains from data transmission, due to a collision, the BS will then need to start the overall process again until a maximum number of allowable tries has been reached.

If there was no collision, the BS transmits the CD-ACK, and upon receiving the corresponding CD-ACK, the intended MS 15 waits until time $t_1$ and enters the data transmission phase. The mobile station measures the power of at least one and preferably all of the signals from the base station, for example, including the signals from the common broadcast channel and the AP-AICH and CD-ICH channels. From this information, the mobile station can determine an appropriate power adjustment, if any, to insure optimum receipt of the common downlink transport channel in the subsequent data transmission phase.

In the data transmission phase, the mobile station MS begins to send its closed-loop power control information at time $t_1$ along with any packet data it may have that is ready to send (line E in FIG. 4). The BS sends its data via a downlink common/shared transport channel, such as FACH (line B in FIG. 4). The BS simultaneously sends its closed-loop power control information via a downlink dedicated channel or DCH (line C in FIG. 4). The MS transmission will stop when the BS transmission stops. The MS may have knowledge of the packet duration through previous downlink signaling or via explicit signals over the DCH.

The message transmission from the mobile station 15 includes at least power control information. In accord with the invention, the base station 13 utilizes the power control information from the mobile station 15 to regulate the transmit-power of the data communications sent through the downlink common/shared transport channel, that is to say through the FACH or DSCH channels in our example. The packet communications between the base station and the mobile stations enable substantially continuous power control of transmissions over the uplink and downlink common transport channels throughout the data transmission phase. Although shown as flat-line pulse transmissions for convenience, in practice the power levels of the data (line B) and control (line C) from the base station and the power level of control and/or data (line E) from the mobile station will all vary dynamically, as a result of the closed loop control.

We will momentarily consider an example of the two-way closed-loop power control, operations in somewhat more detail. During the data communication phase, the base station continually measures the power level of the signal received from the mobile station on the CPCH channel. From this measurement, the base station determines whether the received signal strength is higher or lower than a threshold value. If the measured power of the received uplink signal is higher than the threshold value, the base station sends a transmit power control instruction in the communication over the dedicated downlink channel (DCH) channel, instructing the mobile station to decrease its transmit power by a predetermined increment. If the measured power of the received link CPCH signal is lower than the threshold value, the base station sends a transmit power control instruction over the DCH downlink channel, instructing the mobile station to increase its transmit power on the CPCH packet channel by a predetermined increment.

During this same period, the mobile station continually measures the power level of the signals received from the base station. From this measurement, the mobile station determines whether the received signal strength is higher or lower than a threshold value. If the measured power of the received downlink signals is higher than the threshold value, the mobile station sends a transmit power control instruction in the communication over the CPCH uplink channel, instructing the base station to decrease its transmit power, at least on the common downlink channel by a predetermined increment. Preferably, the mobile station also instructs the base station to increase the transmit power on the dedicated channel (DCH). If the measured power of the received downlink signals is lower than the threshold value, the mobile station sends a transmit power control instruction over the CPCH uplink channel, instructing the base station to increase its transmit power on the common downlink channel and the dedicated channel by a predetermined increment.

Hence, the power of the BS transmission over the common downlink channel is controlled in response to information sent by the MS, in a relatively fast closed-loop manner similar to that previously used for the dedicated transport channel. The new closed loop control, however, utilizes an existing CPCH uplink resource. Since the MS can send data along with its power control information, a bi-directional interactive transmission is created that incorporates two-way closed-loop power control. Since bi-directional communication may not be necessary, however, the CPCH transmissions will most likely only contain control information. That means the RNC can actually allot a number of low-data rate CPCH channels for this purpose.

To ensure a complete understanding of the various aspects of the invention, it may be helpful to consider the structure of preferred embodiments of the inventive base station transceivers and the inventive mobile station transceivers.

Figure 5:
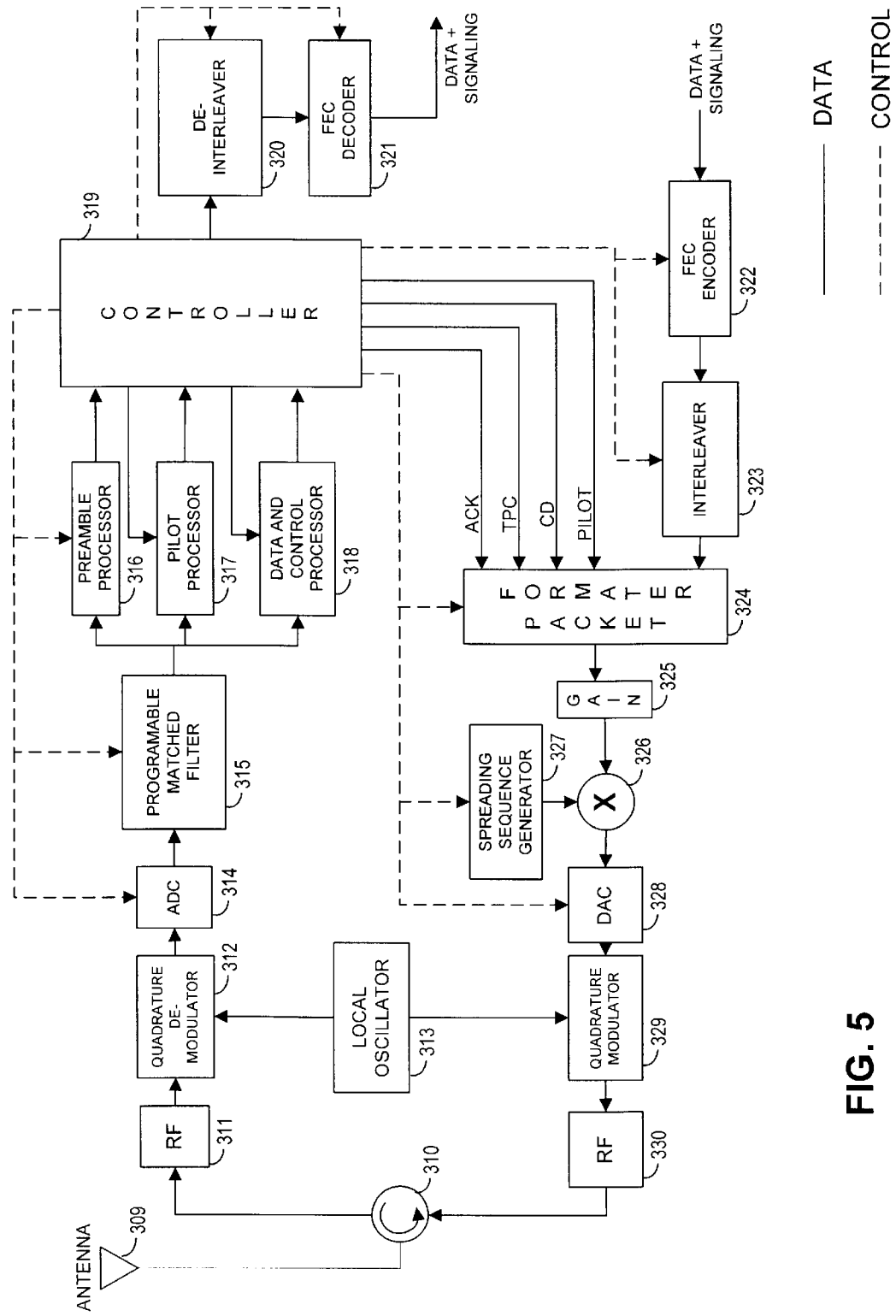
FIG. 5 is a functional block diagram of the transceiver elements (PHY layer) of a spread spectrum base station for use in a network of the type shown in FIG. 3.

FIG. 5 illustrates a presently preferred embodiment of a BS spread-spectrum transmitter and a BS spread-spectrum receiver, essentially in the form of a base-band processor for performing the PHY layer functions. The BS spread-spectrum transmitter and the BS spread-spectrum receiver form one of the transceivers 17 at a base station 13. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321. The decoder 321 outputs data and signaling received via the uplink channel to the MAC layer elements (not shown).

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, the programmable-matched filter 315, the preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by the receiver RF section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. These functions are well known in the art, and variations to this block diagram can accomplish the same functions.

The programmable-matched filter 315 despreads the received spread-spectrum signal components. A correlator, as an alternative, may be used as an equivalent means for despreading the received spread-spectrum signal.

The preamble processor 316 detects the preamble portion of the received spread-spectrum signal. The pilot processor 317 detects and synchronizes to the pilot portion of the received spread-spectrum signal. The pilot processor may also be used to determine the received signal power level. The data and control processor 318 detects and processes the data portion of the received spread-spectrum signal. Detected data passes through the controller 319 to the de-interleaver 320 and FEC decoder 321. Data and signaling from the UL are outputted from the FEC decoder 321 to the higher layer elements in or associated with the BS 13.

In the BS transceiver, the MAC layer elements (not shown) supply data and signaling information, intended for DL transmission, to the input of the FEC encoder 322. The signaling and data are FEC encoded by the FEC encoder 322, and interleaved by the interleaver 323. The packet formatter 324 formats data, signaling, acknowledgment signal, collision detection signal, pilot signal and transmitting power control (TPC) signal into appropriate packets. Each packet is outputted from the packet formatter 324, and the packet level is amplified or attenuated by variable gain device 325. The packet is spread-spectrum processed by product device 326, with a spreading chip-sequence from spreading-sequence generator 327. Scrambling may be incorporated along with spreading, where a common random sequence is used to scramble a number of downlink channels. The packet is converted to an analog signal by digital-to-analog converter 328, and in-phase and quadrature-phase components are generated by quadrature modulator 329 using a signal from local oscillator 313. The modulated downlink packet is translated to a carrier frequency, filtered and amplified by the transmitter RF section 330, and then it passes through the circulator 310 and is radiated by antenna 309.

Figure 6:
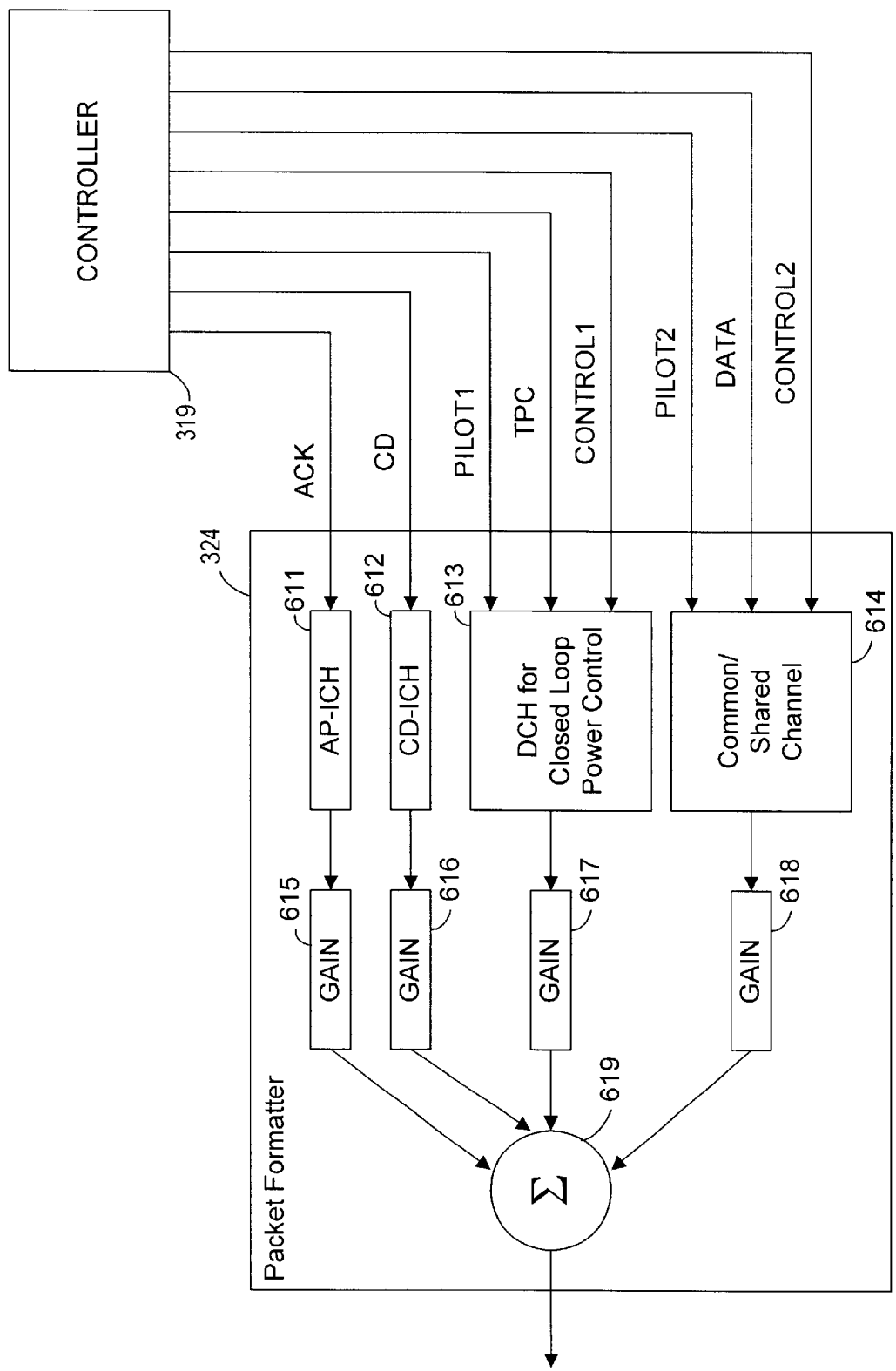
FIG. 6 is a more detailed version of certain elements of the transceiver of FIG. 5.

FIG. 6 shows the functional elements of the packet formatter and the interconnection thereof to the controller. As shown, the packet formatter 324 comprises a number of packet formatters 611 to 614, which supply packets in the appropriate formats to associated gain devices 615–618. In the example, the acknowledgement signal (ACK) for response to the access preamble (AP) is supplied to a packet format module 611 for AP acknowledgment indicator channel (AP-AICH). The collision detection (CD) acknowledgement, for transmission in response to the selected CD preamble signature, is supplied to a packet format module 612 for the CD acknowledgment indicator channel (CD-ICH). A module 613 formats the various signals as packets for communication via the dedicated downlink channel (DCH), and the module 614 formats the various signals as packets for communication via the common downlink channel (e.g. FACH).

The devices 615–618 adjust the gain of the packet signals from the respective modules 611–614. A multiplexer or combiner 619 combines the adjusted packet signals into a serial stream, in preparation thereof for transmission from the base station.

Figure 7:
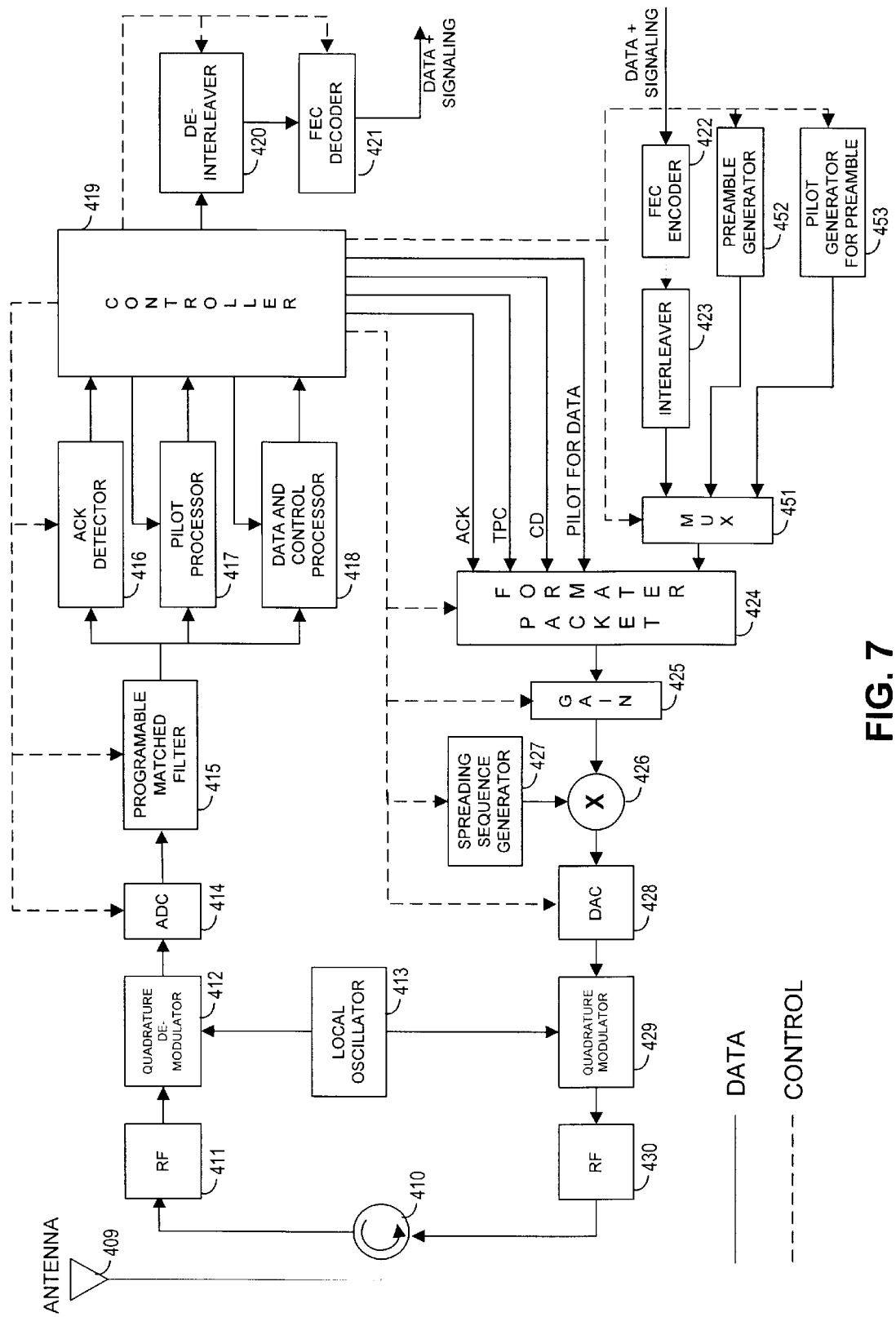
FIG. 7 is a functional block diagram of the transceiver elements (PHY layer) of a spread spectrum remote or mobile station for use in a network of the type shown in FIG. 3.

FIG. 7 shows an embodiment of an MS spread-spectrum transmitter and an MS spread-spectrum receiver, essentially in the form of a base-band processor for performing the PHY layer transceiver functions. The MS spread-spectrum transmitter and the MS spread-spectrum receiver are located at the remote or mobile station (MS) 15, shown in FIG. 3. The MS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. The pilot processor may be used to determine the power of the received downlink signal. A de-interleaver 420 is coupled between the controller 419 and a forward-error-correction (FEC) decoder 421. The decoder 421 outputs data and signaling received via the DL channel to the MAC layer elements (not shown) of the MS.

The MS spread-spectrum transmitter includes a forward-error-correction (FEC) encoder 422 coupled to an interleaver 423. A packet formatter 424 is coupled through a multiplexer 451 to the interleaver 423. The packet formatter 424 also is coupled to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, the programmable-matched filter 415, the acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by the receiver RF section 411. The local oscillator 413 generates a local signal, which the quadrature demodulator 412 uses to demodulate in-phase and quadrature phase components of the received spread-spectrum signal. The analog-to-digital converter 414 converts the in-phase component and the quadrature-phase component to digital signals. These functions are well known in the art, and variations to this block diagram can accomplish the same functions.

The programmable-matched filter 415 despreads the received spread-spectrum signal components. A correlator, as an alternative, may be used as an equivalent means for despreading the received spread-spectrum signal.

The acknowledgment detector 416 detects the acknowledgment in the received spread-spectrum signal. The pilot processor 417 detects and synchronizes to the pilot portion of the received spread-spectrum signal. The data and control processor 418 detects and processes the data portion of the received spread-spectrum signal. Detected data passes through the controller 419 to the de-interleaver 420 and the FEC decoder 421. Data and signaling from the downlink channel are outputted from the FEC decoder 421 to the higher level elements in or associated with the MS 15.

In the MS transceiver, the MAC layer elements (not shown) supply data and signaling information intended for transmission over the UL channel, to the input of the FEC encoder 422. Data and signaling information are FEC encoded by FEC encoder 422, and interleaved by interleaver 423. The preamble generator 452 generates a preamble, and the pilot generator 453 generates a pilot for the preamble. The multiplexer 451 multiplexes the data, preamble and pilot, and the packet formatter 424 formats the preamble, pilot and data into a common-packet channel packet. Further, the packet formatter 424 formats data, signaling, acknowledgment signal, collision detection signal, pilot signal and TPC signal into a packet. The packet formatter 424 outputs the packet, and the packet level is amplified or attenuated by variable gain device 425. The packet is spread-spectrum processed by product device 426, with s spreading chip-sequence from spreading-sequence generator 427. The packet is converted to an analog signal by digital-to-analog converter 428, and quadrature modulator 429 using a signal from local oscillator 413 generates in-phase and quadrature-phase components. The modulated UL packet is translated to a carrier frequency, filtered and amplified by the transmitter RF section 430 and then it passes through the circulator 430 and is radiated by the antenna 409.

Another optional operation of this invention is the base station channel resource assignment. The CPCH resources are assigned to each Base Node by the Radio Network Controller (RNC) 11 based on the traffic demand projection. In operation, the RNC receives traffic measurement information from the base stations B and mobile stations 15. In this way, the RNC 11 monitors traffic demand, as represented by actual traffic measurement information of communications through the base stations 13 for the mobile stations 15. Based on the traffic demand or a projection thereof, the RNC 11 assigns channel resources to the base stations 13, by re-configuring the CPCH channel code resources within each cell. Channel groupings are updated accordingly.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. In a code-division-multiple-access (CDMA) system employing spread-spectrum modulation comprising a base station (BS) comprising a BS-spread-spectrum transmitter and a BS-spread-spectrum receiver, and a plurality of mobile stations, each mobile station (MS) comprising an MS-spread-spectrum transmitter and an MS-spread-spectrum receiver, a method comprising the steps of:

transmitting from the BS-spread-spectrum transmitter, over a broadcast common channel, a signal indicating an intent to send packet data to an identified one of the mobile stations;

receiving the broadcast common channel at the MS-spread-spectrum receiver of the one mobile station;

in response to the signal indicating an intent to send, initiating an exchange of spread-spectrum signals between the one mobile station and the base station to allow the one mobile station to seize a common packet channel (CPCH) channel for uplink communications;

measuring a level of at least one spread-spectrum signal received from the base station by the one mobile station;

transmitting from the MS-spread-spectrum transmitter of the one mobile station at least power control information based on the measured signal level, over the CPCH channel;

receiving the power control information via the CPCH channel, at the BS spread-spectrum receiver;

transmitting the packet data for the one mobile station, from the BS-spread-spectrum transmitter of the base station over a common downlink channel; and controlling power level of the packet data transmission over the common downlink channel in response to the received power control information.

2. A method as set forth in claim 1, further comprising transmitting power control information, to the MS-spread-spectrum receiver of the one mobile station, from the BS-spread-spectrum transmitter of the base station.

3. A method as set forth in claim 2, wherein the transmitting of the power control information to the MS-spread-spectrum receiver of the one mobile station, from the BS-spread-spectrum transmitter of the base station, utilizes a dedicated downlink channel.

4. A method as set forth in claim 1, wherein the exchange of spread-spectrum signals between the one mobile station and the base station to allow the one mobile station to seize the CPCH channel comprises an access phase, the access phase comprising the following steps of:

transmitting from the MS-spread-spectrum transmitter of the one mobile station an access-burst signal, the access-burst signal comprising a plurality of segments having a plurality of respective power levels, each segment comprising an access preamble signature corresponding to the CPCH channel;

receiving at the BS spread-spectrum receiver of the base station at least one segment of the access-burst signal at a detectable-power level;

responsive to receipt of the at least one segment at the detectable power level, transmitting an acknowledgment signal from the BS-spread-spectrum transmitter of the base station, the acknowledgment signal corresponding to the access preamble signature; and receiving the acknowledgment signal at the MS-spread-spectrum receiver of the one mobile station.

5. A method as in claim 4, wherein the exchange of spread-spectrum signals between the one mobile station and the base station to allow the one mobile station to seize the CPCH channel further comprises collision detection phase following the access phase, the collision detection phase comprising the following steps of:

transmitting from the MS-spread-spectrum transmitter of the one mobile station a spread-spectrum signal comprising a collision detection preamble;

receiving the collision detection preamble from the one mobile station at the BS spread-spectrum receiver of the base station;

transmitting from the BS-spread-spectrum transmitter of the base station a base station collision detection preamble, the base station collision detection preamble corresponding to the collision detection preamble from the one mobile station; and receiving the base station collision detection preamble at the MS-spread-spectrum receiver of the one mobile station, wherein the step of transmitting at least power control information from the MS-spread-spectrum transmitter of the one mobile station is responsive to the receipt of the base station collision detection preamble.

6. A method as set forth in claim 1, wherein the common downlink channel comprises a forward access channel.

7. A method as in claim 1, wherein the base station receives the packet data for the one mobile station from a wide area data network.

8. A method as in claim 1, wherein the at least one spread-spectrum signal comprises the transmitted packet data, and the steps of measuring level, transmitting power control information, receiving the power control information and controlling power level continue substantially throughout the packet data transmission, so as to provide dynamic control of the packet data transmission over the common downlink channel.

9. A method as in claim 1, further comprising:

scheduling transmission of the packet data to the one mobile station for a predetermined time, at a radio network controller; and transmitting the packet data from the radio network controller to the base station and instructing the base station to schedule transmission of the packet data at the predetermined time.

10. A code-division-multiple-access (CDMA) wireless base station, comprising:

a CDMA transmitter;

a CDMA receiver; and a controller coupled to the CDMA receiver for responding to signals received via the CDMA receiver and coupled for controlling the CDMA transmitter, such that in operation the CDMA base station is for performing the following steps:

transmitting over a broadcast common channel, a signal indicating an intent to send packet data to one of a plurality of remote stations;

exchanging signals with the one remote station to enable the one remote station to seize a common packet channel for uplink communications;

receiving at least power control information over the common packet channel from the one remote station;

transmitting the packet data for the one remote station over a common downlink channel; and dynamically controlling power of the transmission of the packet data over the common downlink channel in response to the power control information from the one remote station.

11. A CDMA wireless base station as in claim 10, wherein the controller is further responsive to the CDMA receiver and controls the CDMA transmitter, such that in operation of the CDMA base station the exchanging of signals with the one remote station includes an access phase, comprising the steps of:

receiving at least a portion of an access burst from the one remote station, the access burst comprising a sequence of coded preamble signals at sequentially increasing discrete power levels, each coded preamble signal in the sequence comprising a signature code corresponding to the common packet channel;

detecting a first one of the coded preamble signals of the sequence that is received at an adequate power level; and upon detection of the first coded preamble signal at the adequate power level, transmitting an access acknowledgement signal corresponding to the one signature code.

12. A CDMA wireless base station as in claim 11, wherein the controller is further responsive to the CDMA receiver and controls the CDMA transmitter, such that in operation of the CDMA base station the exchanging of signals with the one remote station further includes a collision detection phase, comprising the steps of:

receiving one of a plurality of collision detection preamble signals from the one remote station; and transmitting a collision detection acknowledgement signal corresponding to the one collision detection preamble signal.

13. A CDMA wireless base station as in claim 10, wherein the controller is further responsive to the CDMA receiver and controls the CDMA transmitter, such that in operation the CDMA base station performs the additional step of transmitting power control information to the remote station over a dedicated downlink channel.

14. A CDMA wireless base station as in claim 10, wherein the controller is further responsive to the CDMA receiver and controls the CDMA transmitter such that in operation the transmitting of the packet data for the one remote station utilizes a forward access channel as the common downlink channel.

15. A base-band processor, for use in a code-division-multiple-access (CDMA) wireless base station having a modulator and a demodulator, the base-band processor comprising:

a preamble processor, coupled to the demodulator, for detecting a preamble in a received spread-spectrum signal;

a data processor, coupled to the demodulator, for detecting and processing any of control information or data contained in the received spread-spectrum signal;

an encoder, for encoding data;
an interleaver, coupled to the encoder, for interleaving encoded data;
a packet formatter, coupled to the interleaver, for formatting the interleaved data into a packet; and
a controller coupled to the preamble processor and coupled for controlling the modulator, the data processor and the packet formatter, such that in operation the base-band processor is for performing the following steps:
  transmitting over a broadcast common channel, a signal indicating an intent to send packet data to one of a plurality of remote stations;
  exchanging signals with the one remote station to enable the one remote station to seize a common packet channel for uplink communications;
  receiving at least power control information over the common packet channel from the one remote station;
  transmitting the packet data for the one remote station over a common downlink channel; and
  dynamically controlling power of the transmission of the packet data over the common downlink channel in response to the power control information from the one remote station.

16. A base-band processor as in claim 15, wherein the controller is further arranged such that in operation of the base-band processor, the exchanging of signals with the one remote station includes an access phase, comprising the steps of:
  receiving at least a portion of an access burst from the one remote station, the access burst comprising a sequence of coded preamble signals at sequentially increasing discrete power levels, each coded preamble signal in the sequence comprising a signature code corresponding to the common packet channel;
  detecting a first one of the coded preamble signals of the sequence that is received at an adequate power level; and
  upon detection of the first coded preamble signal at the adequate power level, transmitting an access acknowledgement signal corresponding to the one signature code.

17. A base-band processor as in claim 16, wherein the controller is further arranged such that in operation of the CDMA base station the exchanging of signals with the one remote station further includes a collision detection phase, comprising the steps of:
  receiving one of a plurality of collision detection preamble signals from the one remote station;
  transmitting a collision detection acknowledgement signal corresponding to the one collision detection preamble signal.

18. A base-band processor as in claim 15, wherein the controller is further arranged such that in operation the base-band processor is for transmitting power control information to the remote station over a dedicated downlink channel.

19. A base-band processor as in claim 15, wherein the controller is further arranged such that in operation the base-band processor transmits the packet data for the one remote station utilizing a forward access channel as the common downlink channel.

20. A code-division-multiple-access (CDMA) wireless remote station, comprising:
  a CDMA transmitter;
  a CDMA receiver; and
  a controller coupled to the CDMA receiver for responding to signals received via the CDMA receiver and coupled for controlling the CDMA transmitter, such that in operation the CDMA remote station is for performing the following steps:
    receiving a downlink signal from a base station indicating an intent to transmit data to the CDMA remote station;
    exchanging signals with the base station to seize a common packet channel uplink resource;
    receiving a packet data signal from the base station over a common downlink channel;
    measuring a level of the packet data signal received from the base station substantially continuously throughout the reception of the packet data;
    transmitting power control instructions, based on the measured level, over the common packet channel uplink resource to the base station during the reception of the packet data.

21. A CDMA wireless remote station as in claim 20, wherein the controller is further responsive to the CDMA receiver and controls the CDMA remote station, such that in operation the CDMA remote station is for performing the additional steps:
  measuring level of at least one signal received from the base station during the exchanging of signals; and
  transmitting an initial power control instruction over the common packet channel uplink source, the initial instruction being dependent on the measured level of the at least one signal received from the base station during the exchanging of signals.

22. A CDMA wireless remote station as in claim 20, wherein the controller is further responsive to the CDMA receiver and controls the CDMA transmitter, such that in operation of the CDMA remote station, the exchanging of signals with the base station to seize the common packet channel uplink resource includes an access phase, comprising:
  transmitting an access burst comprising a sequence of coded preamble signals at sequentially increasing discrete power levels, each coded preamble signal in the sequence comprising a signature code corresponding to the common packet channel uplink resource; and
  receiving an acknowledgement signal corresponding to the one signature code from the base station.

23. A CDMA wireless remote station as in claim 22, wherein the controller is further responsive to the CDMA receiver and controls the CDMA transmitter, such that in operation of the CDMA remote station, the exchanging of signals with the base station to seize the common packet channel uplink resource further includes a collision detection phase, comprising:
  selecting one of a plurality of possible collision detection codes;
  transmitting the selected collision detection code;
  receiving and recognizing a collision detection acknowledgement signal from the base station, the collision detection acknowledgement signal corresponding to the selected collision detection code.

24. A CDMA wireless remote station as in claim 20, wherein the controller and the CDMA receiver are further arranged such that in operation the CDMA remote station also receives and responds to uplink power control information from the base station over a dedicated downlink channel.

25. A CDMA wireless remote station as in claim 20, wherein the controller and the CDMA receiver are further arranged so as to utilize a forward access channel as the common downlink channel, for receiving the packet data signal.

26. A base-band processor, for use in a code-division-multiple-access (CDMA) wireless remote station having a spread-spectrum modulator and a spread-spectrum demodulator, the base-band processor, comprising:

an data and control signal detector, coupled to the demodulator, for detecting data and control information in a received spread-spectrum signal;

an encoder, for encoding data;

an interleaver, coupled to the encoder, for interleaving encoded data;

a preamble generator for generating a preamble;

a multiplexer, coupled to the interleaver and to the preamble generator, for multiplexing the interleaved data and the preamble;

a packet formatter, coupled to the multiplexer, for formatting the multiplexed data and preamble into one or more packets; and a controller coupled to the data and control signal detector and coupled for controlling the modulator, the preamble generator, the multiplexer and the packet formatter, such that in operation the base-band processor is for performing the following steps:

receiving a downlink signal from a base station indicating an intent to transmit data to the CDMA remote station;

exchanging signals with the base station to seize a common packet channel uplink resource;

receiving a packet data signal from the base station over a common downlink channel;

measuring a level of the packet data signal received from the base station substantially continuously throughout the reception of the packet data;

transmitting a power control instruction, based on the measured level, over the common packet channel uplink resource to the base station during the reception of the packet data.

27. A base-band processor as in claim 26, further comprising an acknowledgement detector, wherein the controller is further arranged such that in operation of the CDMA remote station, the exchanging of signals with the base station to seize the common packet channel uplink resource includes an access phase, comprising:

transmitting an access burst comprising a sequence of coded preamble signals at sequentially increasing discrete power levels, each coded preamble signal in the sequence comprising signature code corresponding to the common packet channel uplink resource; and receiving an acknowledgement signal corresponding to the one signature code from the base station.

28. A base-band processor as in claim 27, wherein the controller is further arranged such that in operation of the CDMA remote station, the exchanging of signals with the base station to seize the common packet channel uplink resource further includes a collision detection phase, comprising:

selecting one of a plurality of possible collision detection codes;

transmitting the selected collision detection code;

receiving and recognizing a collision detection acknowledgement signal from the base station, the collision detection acknowledgement signal corresponding to the selected collision detection code.

29. A base-band processor as in claim 28, wherein the controller is further arranged such that in operation the CDMA remote station further performs the steps of:

measuring level of at least one signal received in the access phase or the collision detection phase; and transmitting an initial power control instruction over the common packet channel uplink resource based on the measured level of the at least one signal received during the access phase or the collision detection phase.

30. A base-band processor as in claim 26, wherein the controller is further arranged such that in operation the remote station also receives and responds to uplink power control information from the base station over a dedicated downlink channel.

31. A base-band processor as in claim 26, wherein the controller is further arranged such that the remote station utilizes a forward access channel as the common downlink channel, for receiving the packet data signal from the base station.

* * * * *